(12) United States Patent
Harms

(10) Patent No.: US 11,875,710 B2
(45) Date of Patent: Jan. 16, 2024

(54) SIGNAGE AND METHOD OF PACKAGING THE SAME

(71) Applicant: Gill Studios, Inc., Lenexa, KS (US)

(72) Inventor: Jeffrey W. Harms, Lawrence, KS (US)

(73) Assignee: Gill Studios, Inc., Lenexa, KS (US)

( * ) Notice: Subject to any disclaimer, the term of this patent is extended or adjusted under 35 U.S.C. 154(b) by 0 days.

(21) Appl. No.: 17/731,010

(22) Filed: Apr. 27, 2022

(65) Prior Publication Data
US 2022/0343805 A1 Oct. 27, 2022

Related U.S. Application Data

(60) Provisional application No. 63/180,550, filed on Apr. 27, 2021.

(51) Int. Cl.
*G09F 7/18* (2006.01)
*F16B 7/04* (2006.01)

(52) U.S. Cl.
CPC ............... *G09F 7/18* (2013.01); *F16B 7/044* (2013.01); *G09F 2007/1834* (2013.01)

(58) Field of Classification Search
CPC .... G09F 7/18; G09F 2007/1834; F16B 7/044; F16B 7/0433; F16B 7/0486
See application file for complete search history.

(56) References Cited

U.S. PATENT DOCUMENTS

| 1,406,916 | A | * | 2/1922 | Arnold | G09F 15/0006 |
| | | | | | 40/606.17 |
| 5,682,696 | A | | 11/1997 | Gill | |
| 5,881,495 | A | * | 3/1999 | Clark | A01G 25/02 |
| | | | | | 52/165 |
| 6,397,451 | B1 | | 6/2002 | Gill | |
| 7,367,147 | B2 | * | 5/2008 | Harms | G09F 15/00 |
| | | | | | 40/607.05 |
| 2009/0119961 | A1 | * | 5/2009 | Harms | G09F 15/0025 |
| | | | | | 40/607.05 |

* cited by examiner

*Primary Examiner* — Cassandra Davis
(74) *Attorney, Agent, or Firm* — AVEK IP, LLC

(57) ABSTRACT

A sign having a display section formed from two pliable sheets and a frame assembly having members joined by various connector pieces. The connector pieces may include couplers and corner pieces. The connector pieces may be used to construct the frame assembly. The connector pieces may also be used to stow the frame assembly when the sign is not in use or being packaged for shipment and also during shipment. For example, the connector pieces may cover the ends of frame assembly members to keep them organized and to keep the members from piercing packaging or other parts of the sign.

9 Claims, 16 Drawing Sheets

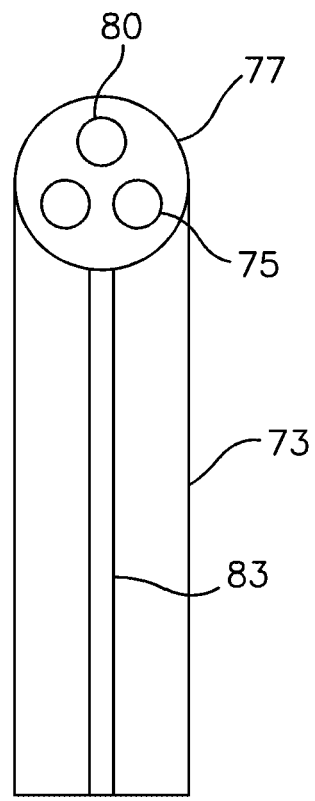
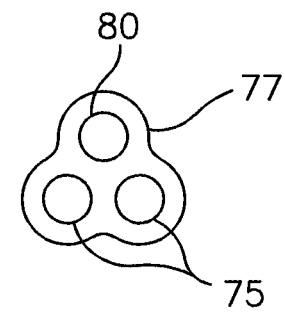
Fig. 13
Fig. 15
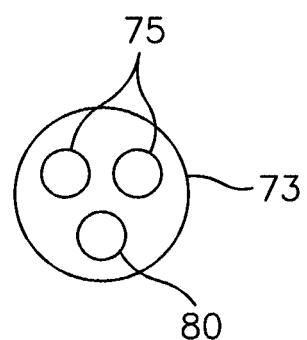
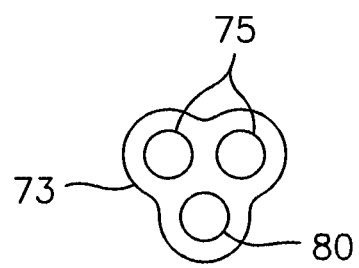
Fig. 14
Fig. 16

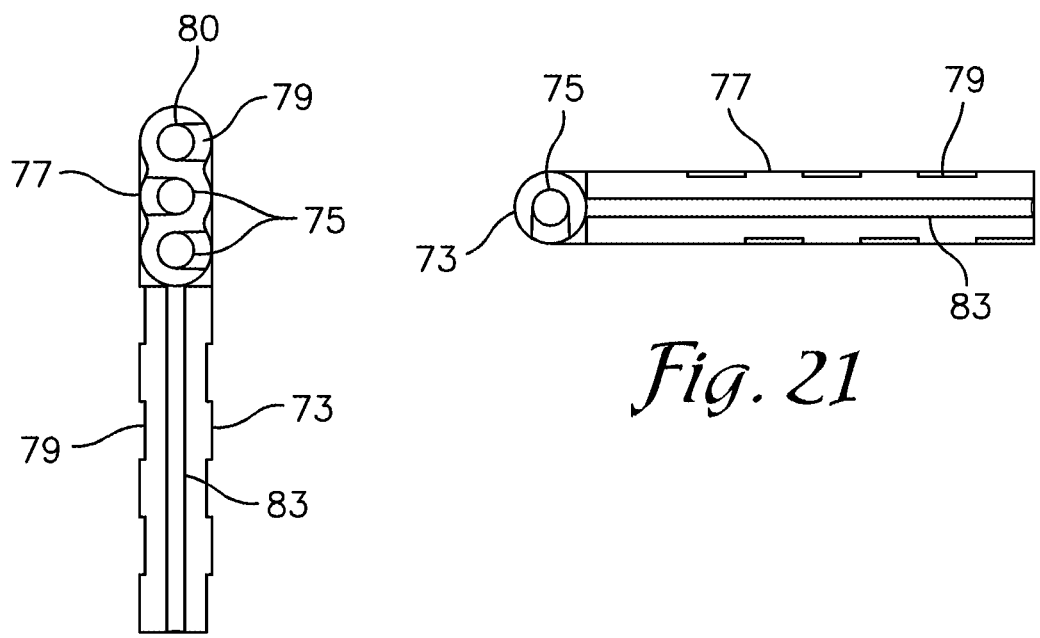
Fig. 20
Fig. 21
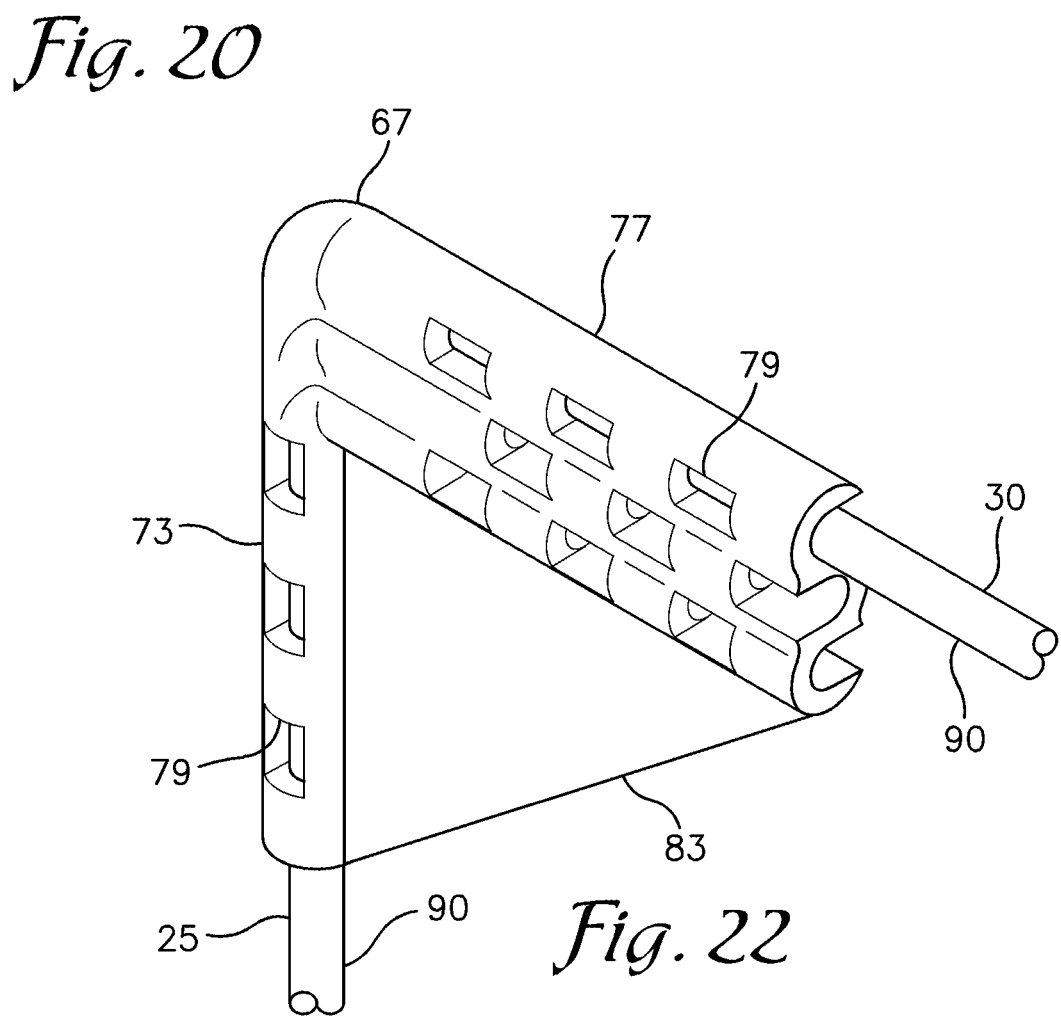
Fig. 22

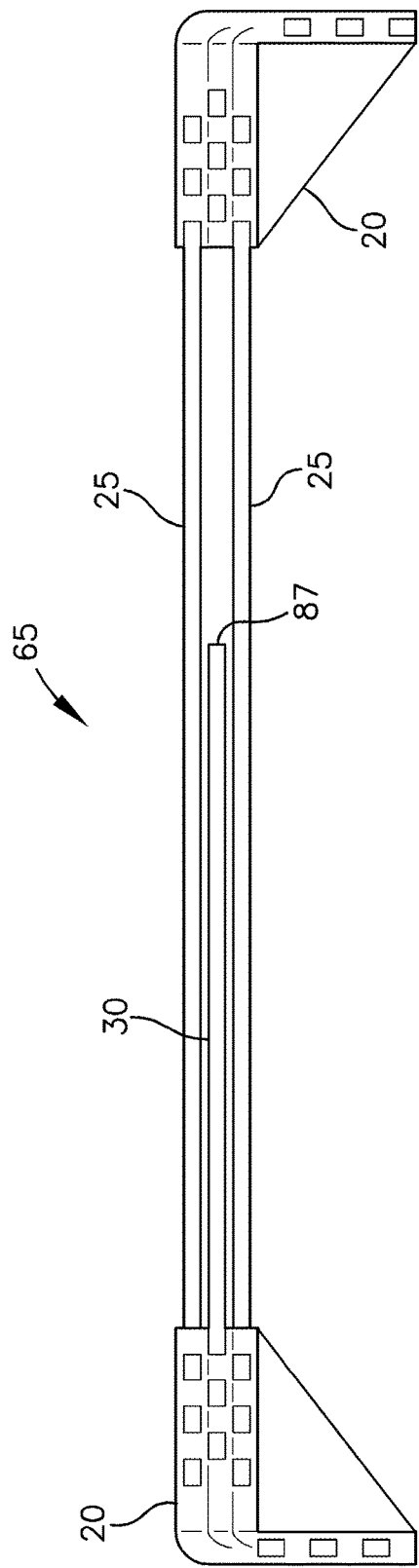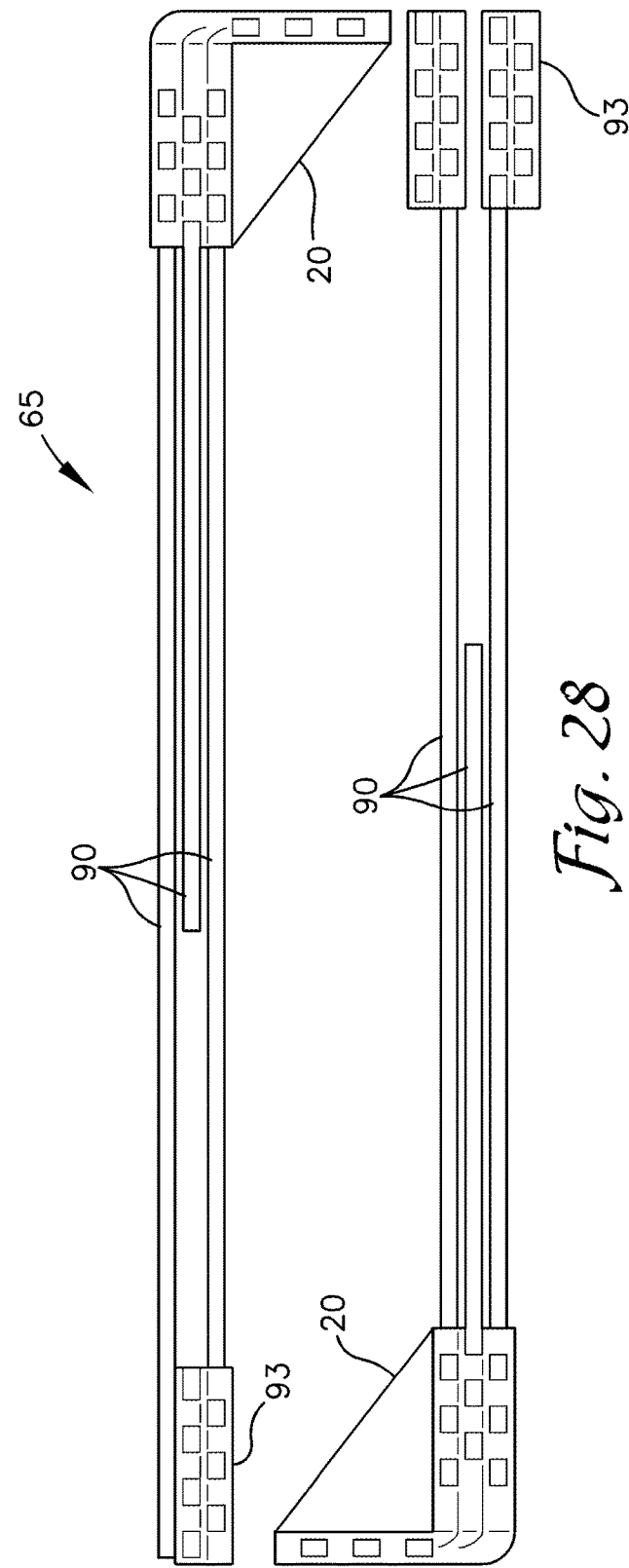

SIGNAGE AND METHOD OF PACKAGING THE SAME

CROSS-REFERENCE TO RELATED APPLICATION

This application claims the benefit of U.S. provisional application Ser. No. 63/180,550, filed Apr. 27, 2021, titled SIGNAGE AND METHOD OF PACKAGING THE SAME.

FIELD

The present invention relates generally to signage. More specifically, the invention relates to a sign and supporting sign frame that can be packaged in a way that minimizes its overall size and weight and the possibility of damage to the package or contents during shipping, while also being easy to assemble by the recipient. The supporting sign frame, when assembled by the user, becomes a strong, rigid structure capable of supporting the flexible plastic sign.

BACKGROUND

Various technologies exist for ground-based signage. For example, there are folding A-frame signs, metal frame signs, wooden signs, and wire frame signs. Some wire frame signs include a pliable plastic display section that fits over a supporting frame. These signs are sometimes referred to as bag signs due to the inverted bag-like shape of the display section. Plastic bag signs are a popular option due to their relatively simple construction, low cost and low weight. Many manufacturers sell bag signs that can be placed in residential yards or similar settings. Also, some companies and universities have started offering bag signs to customers or students in hopes that the signs will be a source of advertising when placed in a yard. Due to their low cost, bag signs are also able to be custom printed in small quantities and shipped directly to customers using the postal service or other package delivery services.

When shipping an individual bag sign, it can be challenging to ensure that the sign, frame and package are not damaged during shipment. Bag signs typically include a flexible plastic section and a wire frame that supports the plastic section. Conventional packaging methods can result in the wire frame being bent or, in some cases, the ends of the long wires puncturing the packaging or damaging the plastic display section. What is needed is a sign that can be packaged and shipped in a way that minimizes the chance of damage, while at the same time being easy for a recipient to unpackage and assemble for use. The present invention addresses this need.

SUMMARY

The present invention relates to a sign having a display section formed from two pliable sheets and a frame assembly having members joined by various connector pieces. The connector pieces may include corner pieces and as well as coupler pieces. The connector pieces may be used to construct the frame assembly, but they may also be used as protective devices for stowing the frame assembly when the sign is not in use or being packaged for shipment and also during shipment. To use the connector pieces as stowing mechanisms, members of the frame assembly may be secured between two connector pieces. By grouping the frame members together, the chance that one of the frame members will become bent is decreased. The connector pieces also cover the ends of frame members, which keeps the members from piercing packaging or parts of the sign.

In an exemplary embodiment, the frame assembly may include two corner pieces, a first linear member, and a second linear member. The corner pieces may each include a first channel adapted to receive one of the first and second linear members. The display section may have a first face (e.g. one sheet) and a second face (e.g., a second sheet) with a receptacle or pocket formed between the faces. The receptacle may be adapted to receive at least a portion of the frame assembly. There may also be a third linear member and the corner pieces may each include a second channel adapted to receive one of the first, second and third linear members. The first and second channels in the corner pieces may be generally perpendicular to each other. There may also be one or more openings formed in the sidewall of each of the first and second channels. The first linear member may include two rods connected by a first coupler. The second linear member may include two rods connected by a second coupler. The third linear member may include two rods connected by a third coupler. The first and second linear members may be adapted for insertion into the ground.

In another embodiment, the invention comprises a signage kit having a plurality of frame segments adapted to be assembled into a frame for a sign. The frame segments could be rods. The kit may also include a plurality of connector pieces with each piece having a first (and possibly second) channel adapted to receive one of the frame segments. The kit may also have a display with a first face and a second face and a receptacle or pocket formed therebetween adapted to receive at least a portion of the frame. At least two of the connector pieces may be corner pieces. There may also be one or more openings formed in a sidewall of each of the first and second channels in the corner pieces. The kit may also include a packaging sleeve.

In another embodiment, the invention comprises a method of packaging a signage kit that includes the following actions. A plurality of frame segments (e.g., rods) may be collected, wherein the segments are adapted to be assembled into a frame for a sign. A plurality of connector pieces may be gathered, wherein each of the connector piece has first and second channels and the first and second channels are adapted to receive one of the frame segments. At least two of the connector pieces may be corner pieces and each of the corner pieces may have openings formed in the first and second channels. The first channel in a corner piece may be generally perpendicular to the second channel in the corner piece. A shipping assembly may be formed by securing the frame segments to the connector pieces such that each frame segment is inserted into at least one of the channels. A flexible panel may be furled, wherein the panel is adapted to be used as a display section for the sign. The shipping assembly and furled panel may be inserted into a packaging sleeve and the sleeve may be sealed. The packaging sleeve may be labeled with instructions for assembling the signage kit.

BRIEF DESCRIPTION OF THE DRAWINGS

FIG. 13 is a side view of the sign corner piece of FIG. 12.

FIG. 14 is a bottom view of the sign corner piece of FIG. 12.

FIG. 15 is a side view of a sign corner piece in accordance with an alternate embodiment of the invention.

FIG. 16 is a bottom view of the sign corner piece of FIG. 15.

FIG. 20 is a side view of the sign corner piece of FIG. 17.

FIG. 21 is a bottom view of the sign corner piece of FIG. 17.

FIG. 22 is a front perspective view of the sign corner piece of FIG. 17 engaged with frame support members.

FIG. 27 is a front view of a sign frame assembly in a stowed state.

FIG. 28 is a front view of an alternate embodiment of a sign frame assembly in a stowed state.

DETAILED DESCRIPTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," "leftwardly," "upper," and "lower" will refer to the installed position of the item to which the reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Figure 1:
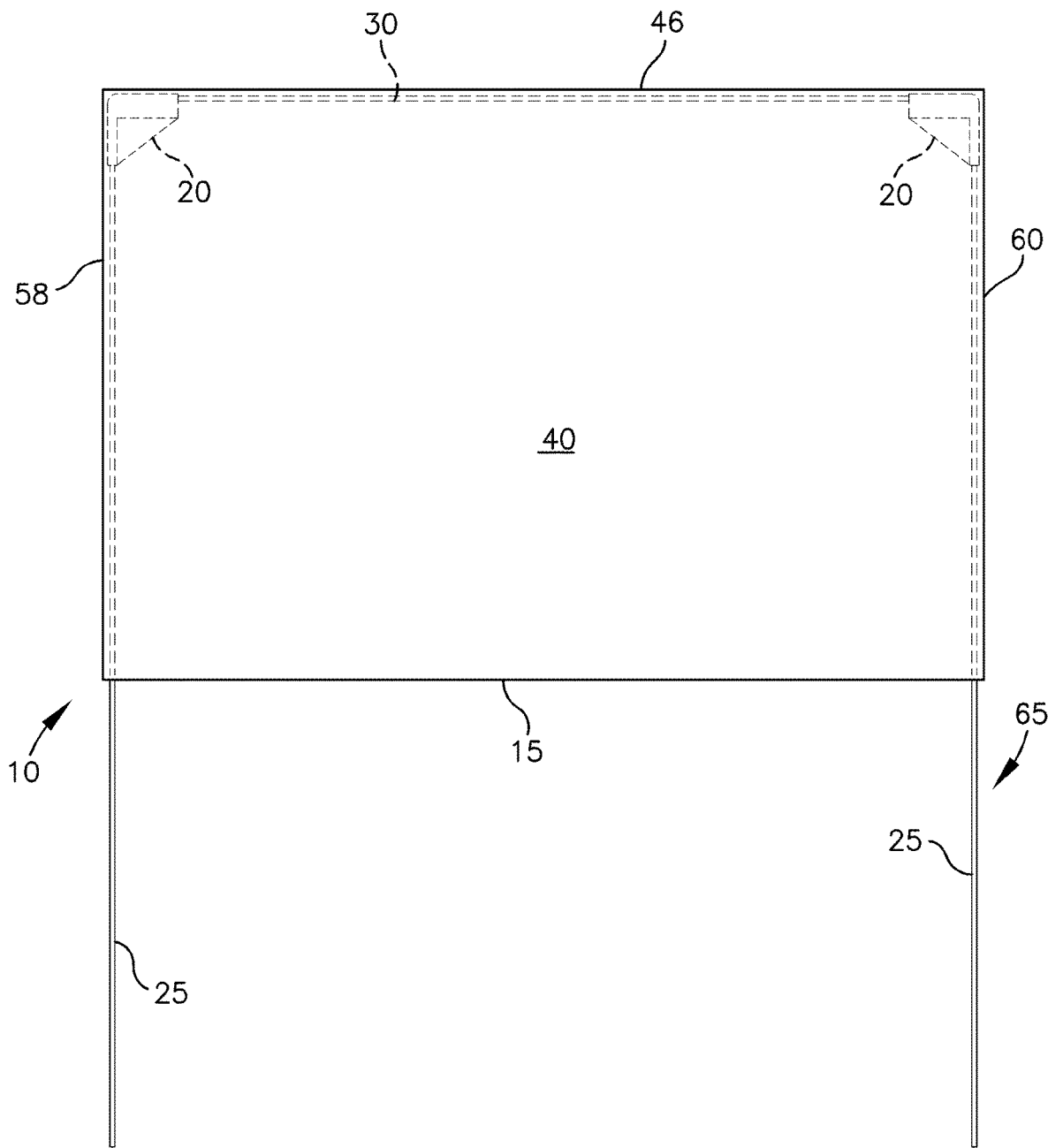
FIG. 1 is a front view of an assembled sign in accordance with an exemplary embodiment of the invention.
Figure 2:
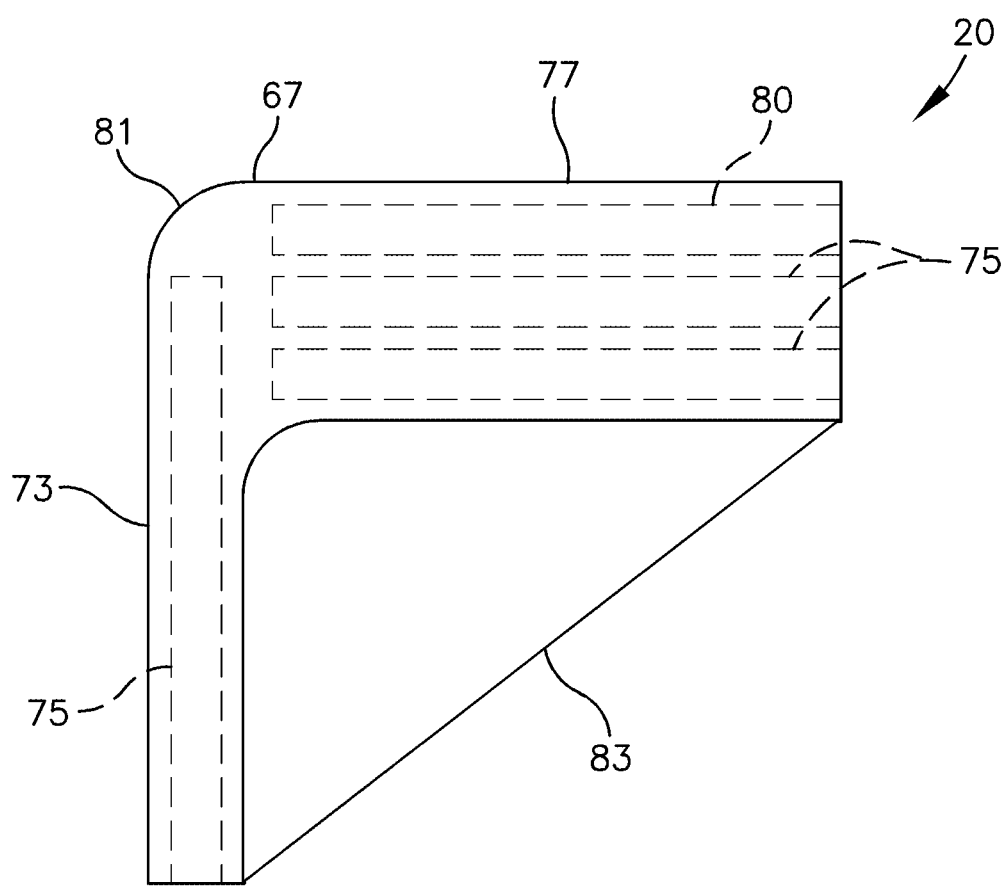
FIG. 2 is a front view of a sign corner piece in accordance with an exemplary embodiment of the invention.
Figure 3:
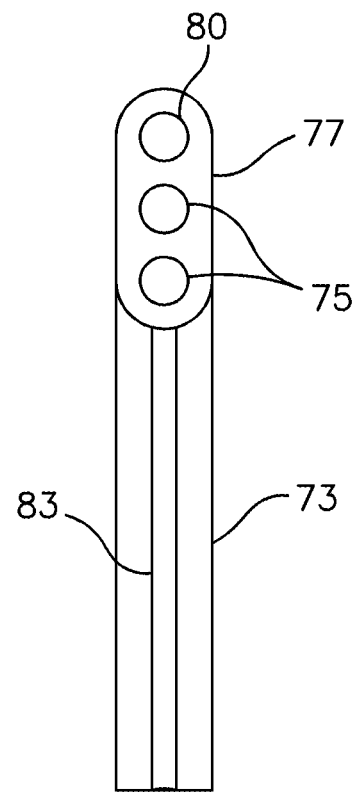
FIG. 3 is a side view of the sign corner piece of FIG. 2.
Figure 4:
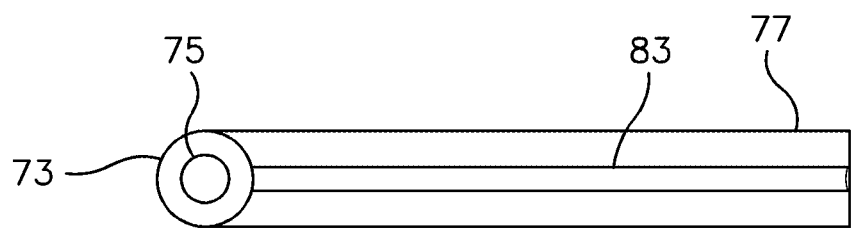
FIG. 4 is a bottom view of the sign corner piece of FIG. 2.
Figure 18:
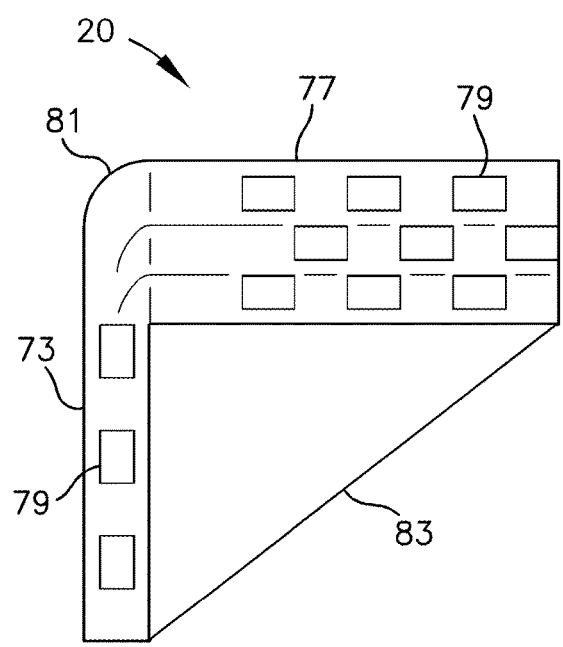
FIG. 18 is a front view of the sign corner piece of FIG. 17.
Figure 19:
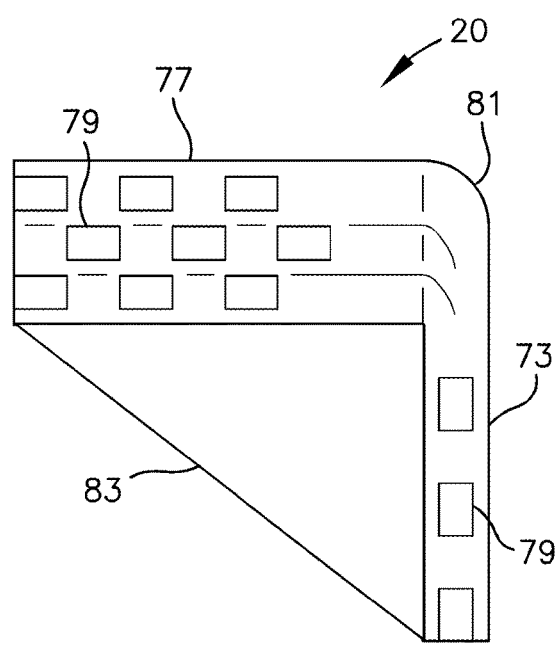
FIG. 19 is a back view of the sign corner piece of FIG. 17.

As shown in FIG. 1, an exemplary embodiment of the invention comprises a sign 10 having an upper display section 15, a plurality of corner pieces 20, a plurality of leg members 25, and an upper horizontal member 30. The invention may also include a sleeve 35 (FIG. 18) for packaging the sign 10.

Display section 15 may include two pliable sheets, a front sheet 40 with a first face and a back sheet 43 (not shown) with a second face, with both sheets joined together at their respective peripheries. The top of front sheet 40 and the top of back sheet 43 may be joined by adhesion, welding, or by folding a single large piece of plastic in half to form a joined top 46. Similarly, a first edge of front sheet 40 and first edge of back sheet 43 may be joined to form a joined first edge 58, and the second edge of front sheet 40 and second edge of back sheet 43 may be joined to form a joined second edge 60. Like the tops, each of the edges may be joined by adhesion, welding, or by folding. It is foreseen that front sheet 40 and back sheet 43 may be constructed of plastic (e.g., polyethylene) or other suitable materials known in the art. The sheets may be flexible, semi-rigid, or even rigid depending on the application.

The joined front sheet 40 and back sheet 43 form an inverted pocket or receptacle capable of receiving a frame assembly 65. Due to the pocket shape of the display section 15, in some embodiments, the display section 15 may resemble a bag, hence the colloquial name "bag sign."

As further shown in FIG. 1, display section 15 is supported by a frame assembly 65. Frame assembly 65 includes two leg members 25 joined to an upper horizontal member 30 using corner pieces 20. Each leg member 25 is a relatively slender rod or segment of wire with sufficient strength to keep sign 10 upright. Once installed, sign 10 could encounter various outdoor elements including wind, rain and snow. Leg member 25 is constructed to keep sign 10 generally upright when such elements are encountered. Sign 10 may be designed such that leg members 25 flex somewhat, such as if blown by wind or hit by a person or object. However, each leg member is relatively resilient and can return sign 10 to its upright position after being flexed. Leg members 25 can be constructed of various types of materials (e.g., plastic, metal, wood, or composite), however it is foreseen that leg members 25 made of heavy-duty wire (e.g., spring steel wire) would be suitable for many applications. Leg members 25 constructed of wire may have a circular transverse cross section, however other cross-sectional shapes are also foreseen (e.g., square, hexagonal, triangular). Each leg member 25 may extend from an upper corner of display section 15, downward proximate one of the joined edges 58 or 60, and out from the lower open portion of the display section 15. Each leg member 25 may be long enough to be inserted into the ground while still holding the display section 15 in a spaced configuration with respect to the ground. For example, in one embodiment, display section 15 may be supported two feet above the ground.

Frame assembly 65 may also include a horizontal member 30 spanning from a first upper corner of the display section 15 to a second upper corner. The member 30 may be located proximate the joined top 46. The length of horizontal member 30 may be such that the width of frame assembly 65 closely approximates the width of display section 15. Horizontal member 30 may constructed of the same material as the leg members 25 or it may be constructed of a different material. It is foreseen that heavy-duty wire (e.g., spring steel wire) may be a suitable material for horizontal member 30 in many applications.

Frame assembly 65 may include a plurality of corner pieces 20 for connecting the leg members 25 to the horizontal member 30. As shown in FIGS. 1, 2, 7, 12, and 17 the body 67 of corner piece 20 may have a generally L-shaped structure. It is foreseen that corner piece 20 can be constructed of various materials (e.g., plastic, metal, composite, wood) however plastic may work well for most applications. Further, corner piece 20 may formed as a single unitary piece or from pieces joined together. Each leg of the L-shaped body 67 may have one or more channels formed therein. A first leg 73 of body 67 may have at least one channel 75 for receiving an end of a leg member 25. A second leg 77 of body 67 may have at least one channel 80 for receiving an end of horizontal member 30. The first and second legs 73 and 77 may be generally perpendicular to each other with an elbow 81 therebetween. A web or gusset 83 may span between first leg 73 and second leg 77 to provide structural support to corner piece 20. Gusset 83 may be joined to each of the legs using adhesive or the like, or it may be formed integral to the legs. A feature of corner piece 20 is that informational or advertising indicia may be printed thereon, for example on the gusset 83.

Channels 75 and 80 are sized to approximate the end of the leg member 25 or horizontal member 30 that is being received. Depending on the application, channels 75 may be the same size and shape as channel 80 (i.e., channels 75 and 80 may be interchangeable and capable of receiving leg member 25 as well as horizontal member 30) or they may be different sizes or shapes. Channels 75 and 80 are configured such that the leg member 25 or horizontal member 30 being received therein is held in place by friction. The channels may have cross-sectional shapes that promote a friction fit. For example, there may be a slight taper from the open end of a channel to the closed end to increase the normal force exerted by the wall of a channel on a leg member 25 or horizontal member 30 inserted into the channel. The increase in normal force leads to an increase in friction. The channels may be shaped to cause a progressively tighter fit as a member is inserted further into the channel. This can help make assembly easier. Also, it is foreseen that materials having some elasticity may result in a better friction fit than non-elastic materials. Corner pieces 20 constructed of plastic or rubber, for example, may improve the friction between the channel 75 or 80 and the respective leg member 25 or horizontal member 30 because the wall of the channel may be capable of some elastic deformation. When a channel wall deforms as it encounters a leg or horizontal member, it can increase the normal force exerted on the member. An elastically deformed channel wall may also increase the amount of contact area between the wall and inserted member, as compared to a purely rigid channel wall. The increased normal force and maximized contact area can lead to increased friction, thereby enhancing the friction fit of the member within the channel. It is also foreseen that various transverse cross-sectional shapes may be used for channels 75 and 80, for example triangular, square, or other polygonal shapes. The cross-sectional shapes of the channels 75 and 80 may coordinate with the cross-sectional shape of the leg member 25 or horizontal member 30 being received (e.g., both may be circular). It is foreseen, however, that the two cross-sectional shapes may also be different.

Figure 17:
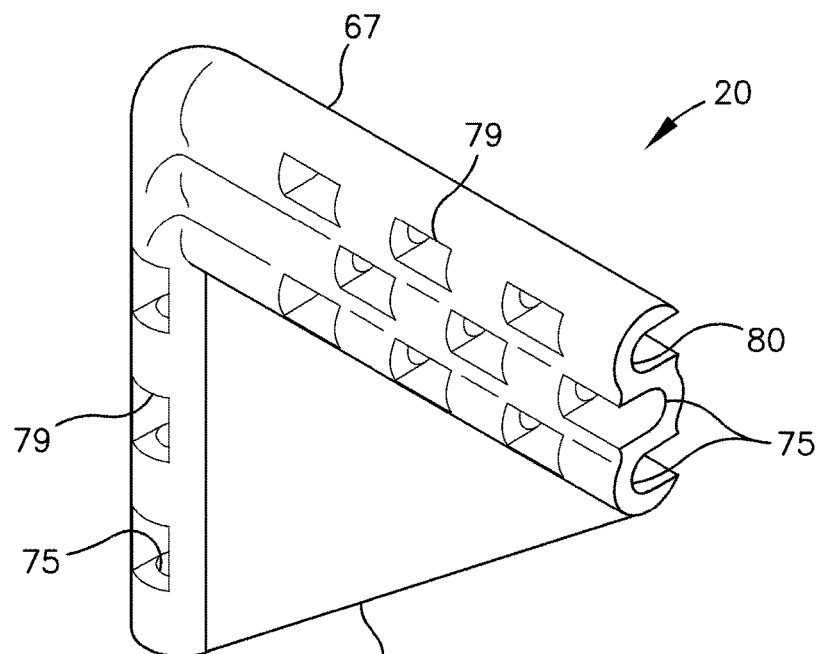
FIG. 17 is a front perspective view of a sign corner piece in accordance with an alternate embodiment of the invention.

Corner piece 20 may take a number of different forms. As shown in FIGS. 2-4 and 17-22, corner piece 20 may include one channel on a first leg 73 and three channels on the second leg 77. Alternatively, as showing in FIGS. 7-16, corner piece 20 may include three channels on a first leg 73 and three channels on the second leg 77. Other configurations for the quantity and configuration of the channels on each of the legs are foreseen. First leg 73 includes a channel 75 for receiving a leg member 25, and second leg 77 may include a channel 80 for receiving horizontal member 30 as well as two channels 75 for receiving leg members 25. This configuration allows for corner piece 20 to serve as a connecter in frame assembly 65 and also, as shown in FIG. 17, a mechanism for stowing the frame assembly when disassembled. Stowing the frame assembly will be discussed in more detail below.

Figure 5:
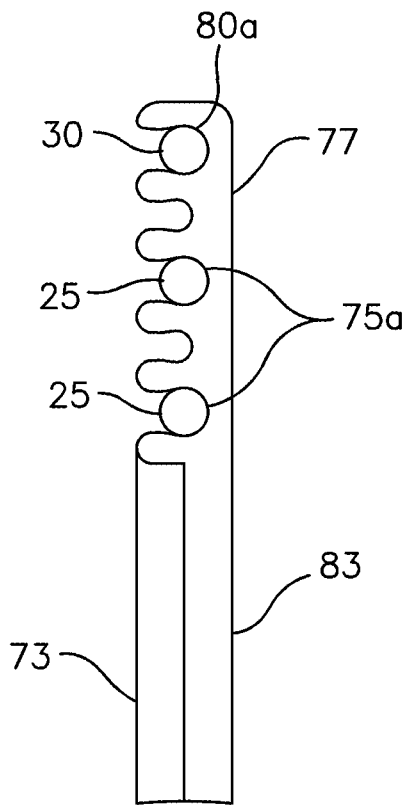
FIG. 5 is a side view of a sign corner piece in accordance with an alternate embodiment of the invention.
Figure 6:
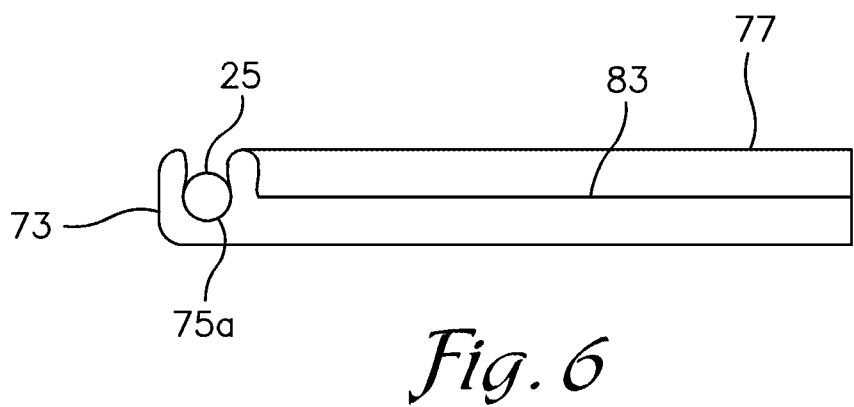
FIG. 6 is a bottom view of the sign corner piece of FIG. 5.
Figure 7:
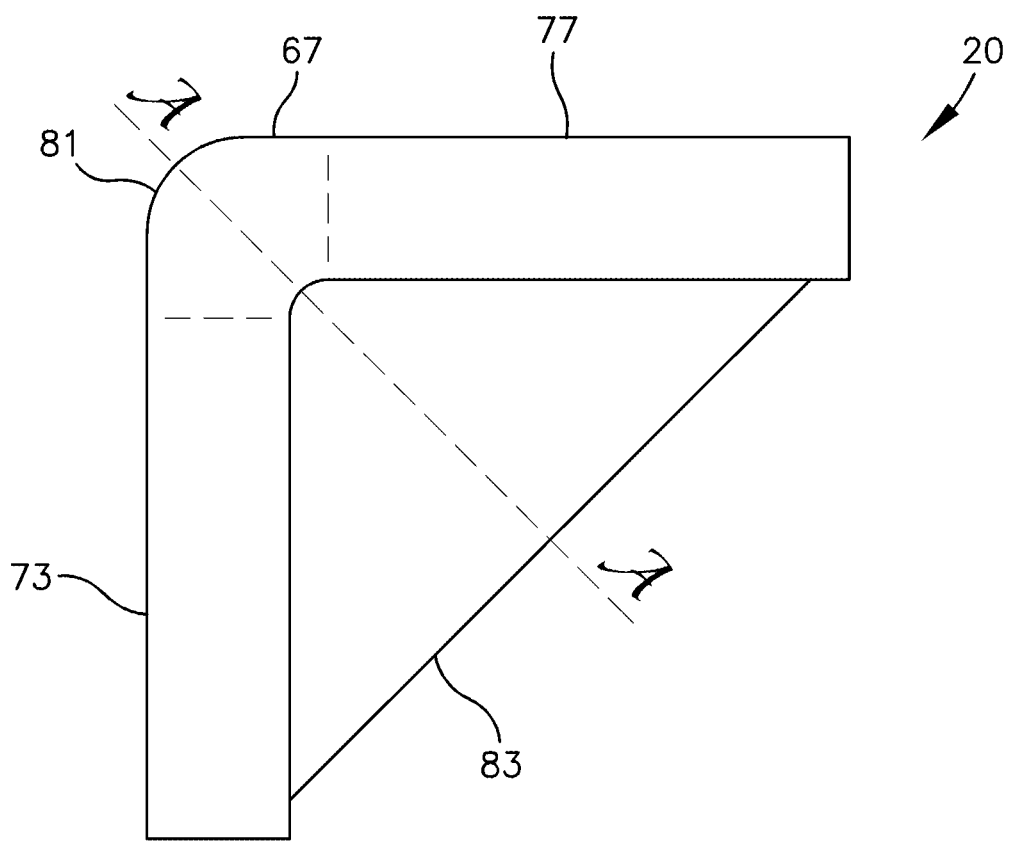
FIG. 7 is a front view of a sign corner piece in accordance with an alternate embodiment of the invention.
Figure 8:
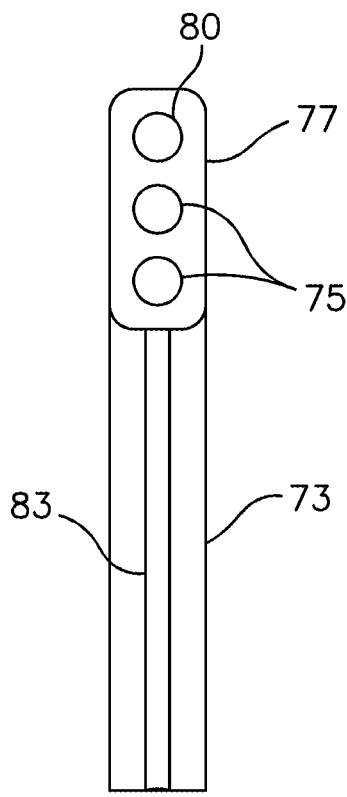
FIG. 8 is a side view of the sign corner piece of FIG. 7.
Figure 10:
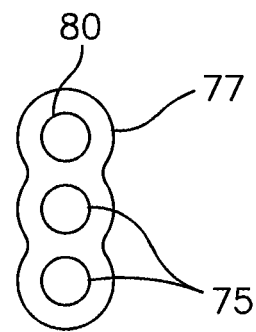
FIG. 10 is a side view of a sign corner piece in accordance with an alternate embodiment of the invention.
Figure 9:
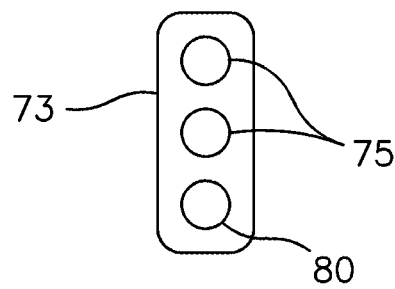
FIG. 9 is a bottom view of the sign corner piece of FIG. 7.
Figure 11:
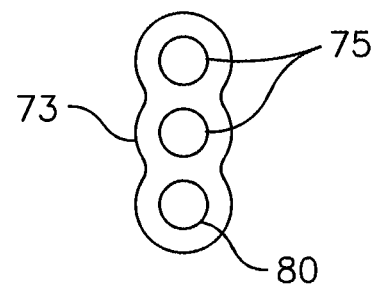
FIG. 11 is a bottom view of the sign corner piece of FIG. 10.
Figure 12:
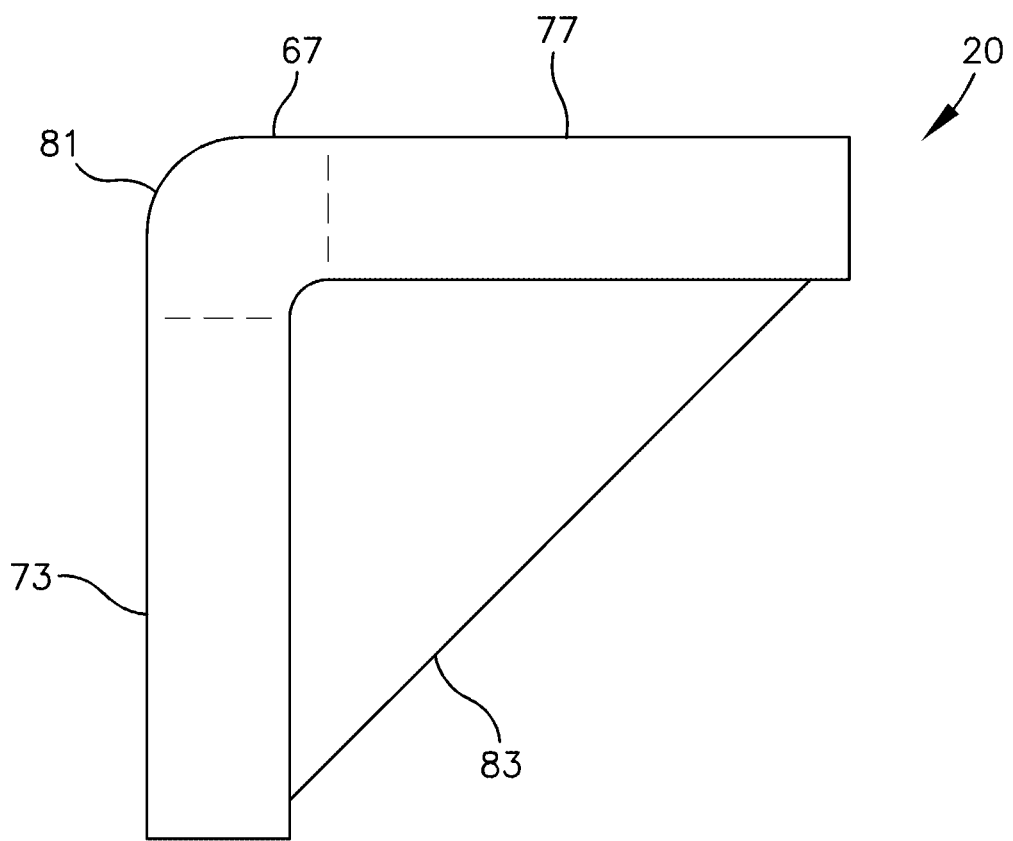
FIG. 12 is a front view of a sign corner piece in accordance with an alternate embodiment of the invention.

Various embodiments of corner piece 20 are shown in FIGS. 2-22. As best seen in FIGS. 5 and 6, in one embodiment, each channel may have a portion of a longitudinal side removed. In that situation, a channel 75a would be capable of receiving a leg member 25 and channel 80a would be capable of receiving horizontal member 30. The walls of channels 75a and 80a may be in the form of a major arc (i.e., a partial circular cross section greater than a semicircle) when viewed in cross section. Because the walls are curved greater than 180 degrees, the respective leg or horizontal member can still be retained within the channel. Channels 75a and 80a may also take the form of an elongated clip, whereby leg members 25 and horizontal members 30 are pressed into their respective channels through the removed portion of the wall. The channels 75a and 80a may also be formed by a series of adjacent clips in axial alignment.

As best seen in FIGS. 17-22, corner piece 20 may also have sections of the longitudinal sides or walls of channels 75 and 80 eliminated. By eliminating sections of the channel walls, corner piece 20 may be easier to manufacture and also save on material costs. For example, by forming channels 75 and 80 such that there are eliminated wall sections 79, it is easier for corner piece 20 to be made using a molding process. Each eliminated wall section 79 may be formed by a projection (not shown) extending inwardly from a mold (not shown) toward the respective channel 75 or 80. This allows a mold to form channels 75 and 80 by arranging projections adjacent one another such that the area in which the tips of the projections align form channels 75 and 80. This may make the molding process for corner pieces 20 easier and less expensive.

As best seen in FIGS. 7-16, corner piece 20 may include three channels on the first leg 73 and three channels on the second leg 77 (as compared to one channel on the first leg and three channels on the second leg). By having three channels on both legs, the orientation of the corner piece 20 becomes less critical, which makes the frame assembly 65 easier and faster to construct. A corner piece 20 having three channels on both legs may be symmetrical about an axis running through the midpoints of gusset 83 and elbow 81. An example of such an axis is shown as axis A-A on FIG. 7. A symmetrical corner piece 20 may also be easier to manufacture in some situations. A symmetrical corner piece 20 may have three channels on both legs, with the three channels consisting of one channel 80 for receiving horizontal member 30 and two channels 75 for receiving leg members 25. The channels can be arranged in a number of ways, including linear alignment (as shown in FIGS. 7-11) or a triangular configuration (as shown in FIGS. 12-16). Additionally, as shown in FIGS. 10, 11, 15, and 16, the area surrounding channels 75 and 80, which can be referred to as a boss, may be fluted or grooved in the area between each channel. Such fluting may be desirable to save on the material required to make each corner piece 20 as well as reduce the weight of the sign 10.

Figure 23:
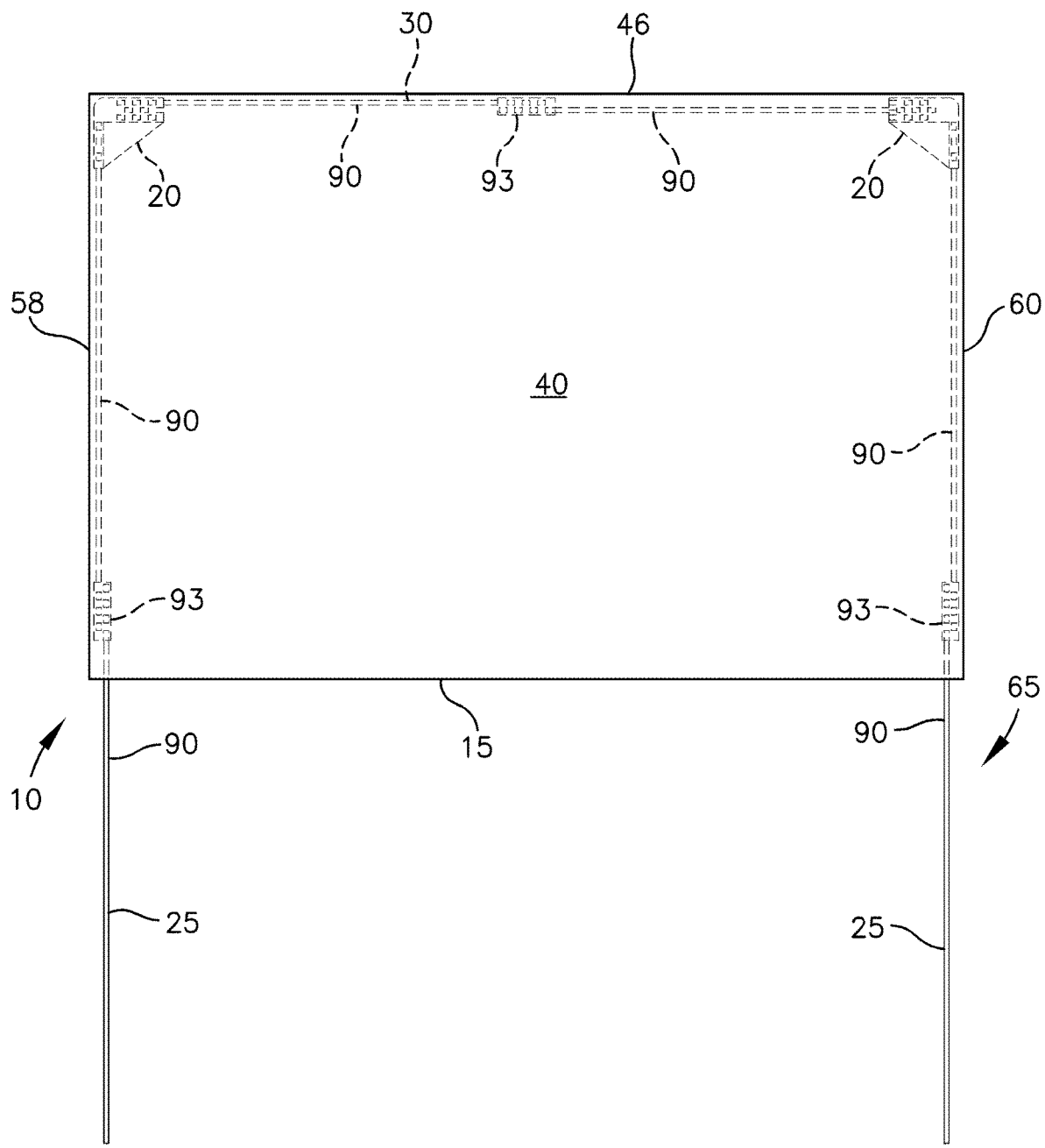
FIG. 23 is a front view of another embodiment of an assembled sign using the corner piece of FIG. 17.
Figure 24:
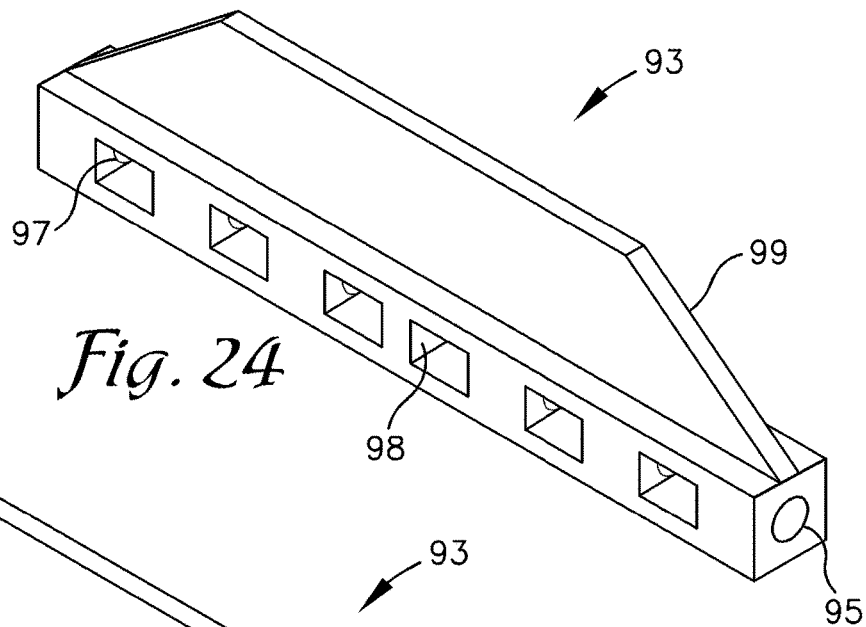
FIG. 24 is a front perspective view of a connector piece in accordance with an alternate embodiment of the invention.
Figure 25:
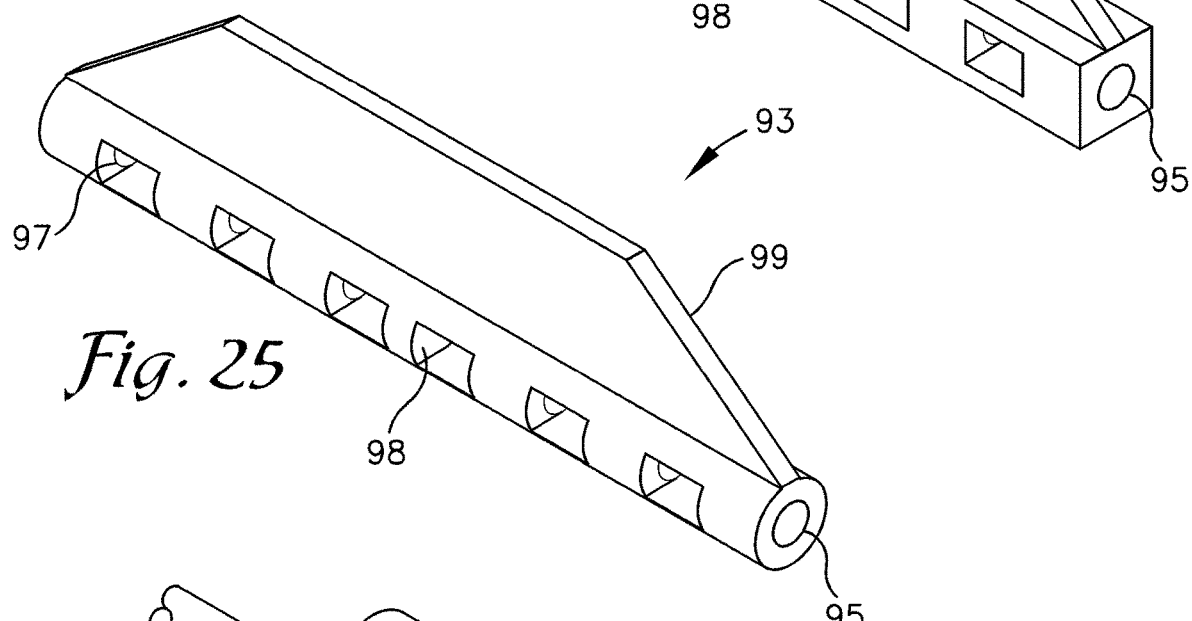
FIG. 25 is a front perspective view of a connector piece in accordance with an alternate embodiment of the invention.
Figure 26:
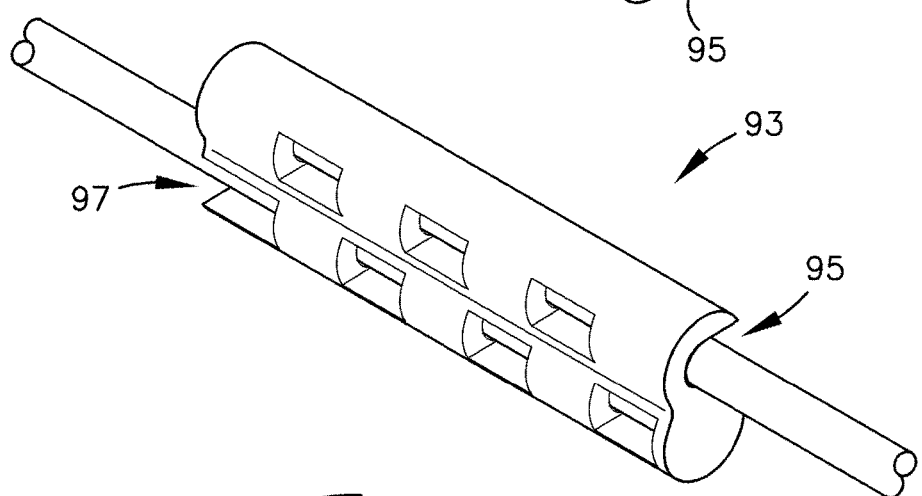
FIG. 26 is a front perspective view of a connector piece in accordance with an alternate embodiment of the invention.

As shown in FIG. 23, leg and horizontal members (25 and 30) may comprise segments 90 joined by a coupler 93. Segments 90 may take the form of rods or wires and could be constructed of various types of materials (e.g., plastic, metal, wood, or composite). Each coupler 93 may include a first channel 95 and a second channel 97 for receiving the ends of segments 90. As best seen in FIGS. 24-26, coupler 93 may be arranged in various configurations including having channels 95 and 97 in axial alignment (FIGS. 24 and 25) and also side by side (FIG. 26). When channels 95 and 97 are in axial alignment, they may be separated by a wall 98 or they may be connected to form a continuous channel through the coupler. Couplers 93 may also include a stiffener or gusset 99 to minimize the flexing of the coupler. The term connector piece may be used herein to refer to corner pieces 20 and couplers 93.

As shown in FIGS. 27 and 28, corner pieces 20 and couplers 93 may also be used as mechanisms for stowing the frame assembly 65 when disassembled or in preparation for shipment. To use corner piece 20 in this fashion, a user may select a leg having three channels (one channel 80 and two channels 75). The first end of horizontal member 30 (or a segment 90 thereof) may be inserted into channel 80 and the first ends of each leg member 25 (or segments 90 thereof) may be inserted into channels 75. At this point, the first ends of the members (or their segments 90) are secured to a corner piece 20. Next, the user selects a second corner piece 20, again with a leg having three channels (one channel 80 and two channels 75). The second ends of each leg member 25 (or their segments 90) are then inserted into channels 75 of the second corner piece 20. Couplers 93 may be placed on horizontal and leg members 30 and 25 or their segments 90 in a similar fashion. The ends of the members 25 or 30 or segments 90 may be placed in the channels of coupler 93 such that coupler 93 caps or shrouds the ends of the members.

As best seen in FIGS. 27 and 28, when frame assembly 65 is stowed using only corner pieces 20, each leg member 25 may be secured between two corner pieces 20 and the horizontal member 30 may be secured at one end by one of the corner pieces 20. This configuration has the advantage of covering the ends of leg members 25, which keeps the ends from piercing packaging or damaging other parts of the sign 10. Couplers 93 may be placed on horizontal and leg members 30 and 25 or their segments 90 in a similar fashion. By grouping the horizontal and leg members together, the frame assembly is stronger than if the members were separate. This decreases the chance that one of the members will be bent during transport. Finally, in a stowed position, free end 87 of horizontal member 30 is relatively close to the secured leg members 25, thus minimizing the chance the free end 87 will move about and damage other parts of the sign 10 or packaging. It may be preferable to position horizontal member 30 between leg members 25 when stowed, to keep free end 87 bounded by the leg members, however the exact configuration of the members will depend on the application. The position of the stowed members will depend on the locations of channels 75 and 80. If channels 75 and 80 are the same size and shape, any of the members may be placed in any of the three holes for stowing, which may be advantageous due to ease of use and manufacturing.

As discussed above, the lengths of the horizontal and leg members are dictated primarily by the size and shape of display section 15. Typically, display section 15 is shaped such that horizontal member 30 is shorter than the leg members 25. This leads to the leg members 25 being bound at both ends by corner pieces 20, while horizontal member 30 is secured at only one end. It is foreseen that there may be differently sized signs having horizontal members 30 that are the same length as, or even longer than, leg members 25. In such cases, the members may be stowed using an alternate configuration of channels in corner pieces 20. Similarly, if members 25 and 30 are segmented, the lengths of segments 90 may dictate the configuration of stowing frame assembly 65 using corner pieces 20 and/or couplers 93.

Figure 29:
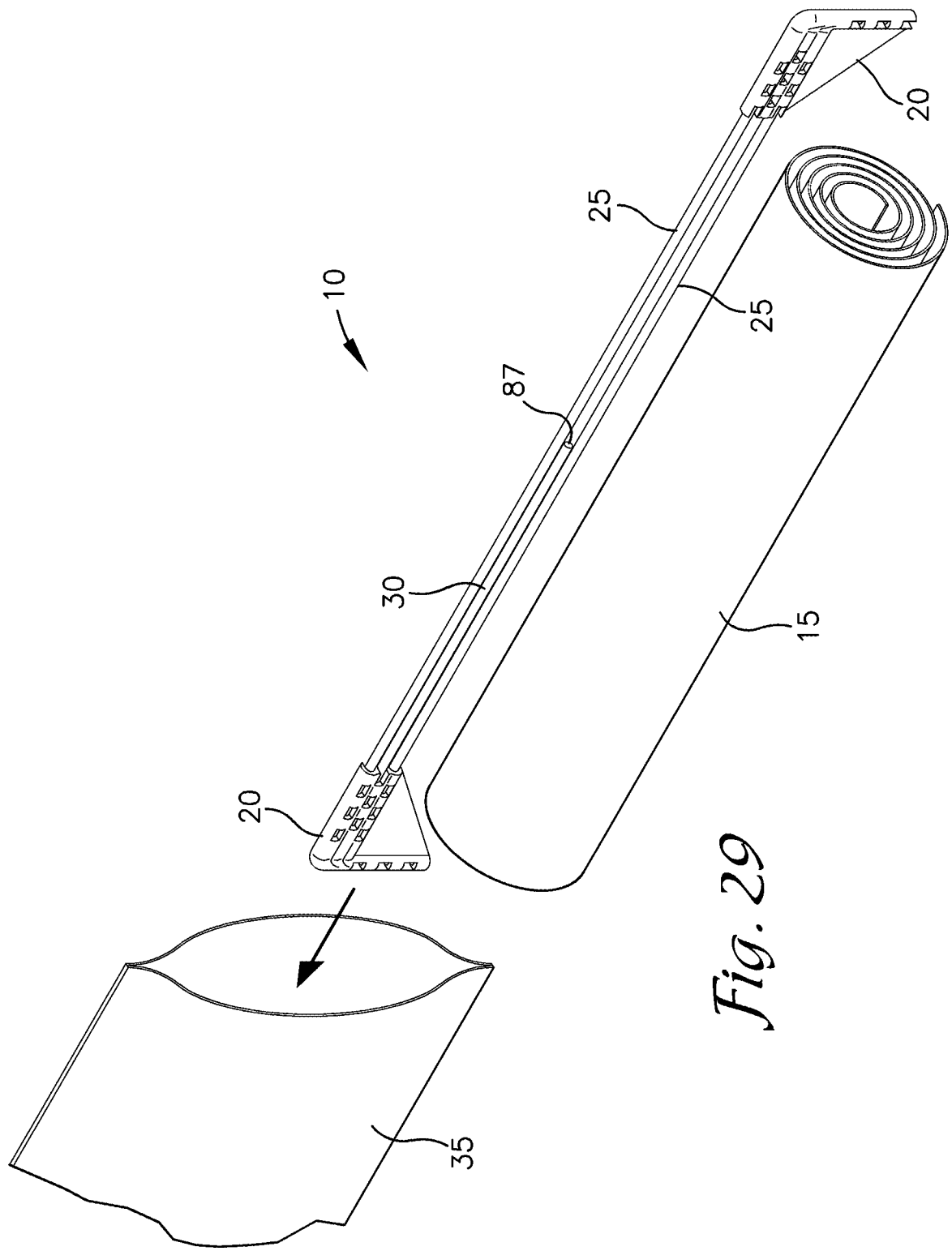
FIG. 29 is a perspective view of a disassembled sign ready for packaging.
Figure 30:
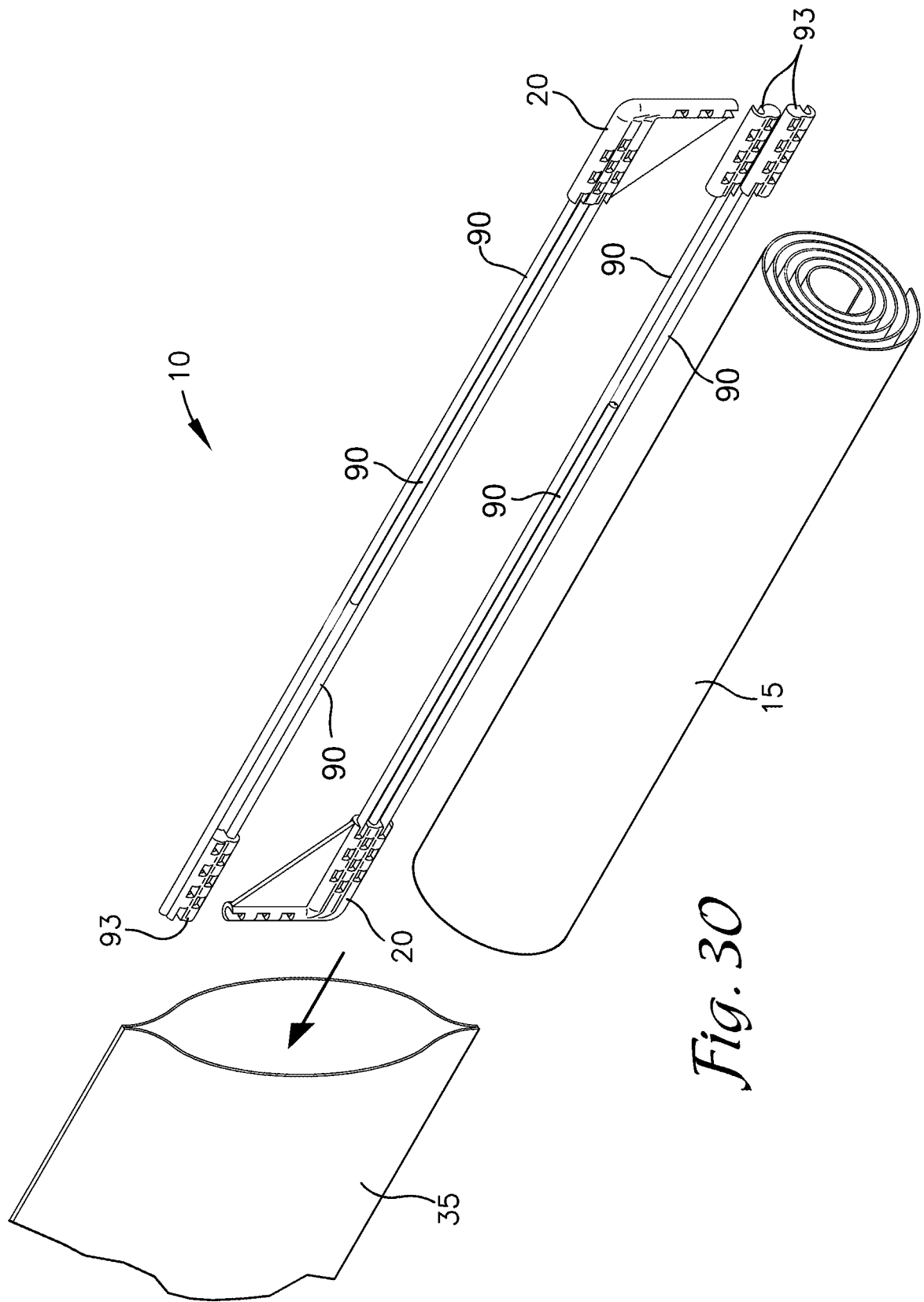
FIG. 30 is a perspective view of an alternate embodiment of a disassembled sign ready for packaging.

As shown in FIGS. 29 and 30, sign 10 may be stowed using corner pieces 20 and/or couplers 93 in preparation for shipment. In one embodiment, the leg and horizontal members (25 and 30) may be secured by the corner pieces 20 and display section 15 may be folded and positioned next to the secured members. Display section 15 may also be wrapped around the secured members. The pieces may then be placed in packaging such as a tube or sleeve 35 to be shipped to a customer. Once received, the sign 10 may be assembled by a customer. Instructions for assembling the sign may be provided in the packaging, or the instructions may be printed on the packaging or an inconspicuous part of the sign 10.

Figure 31:
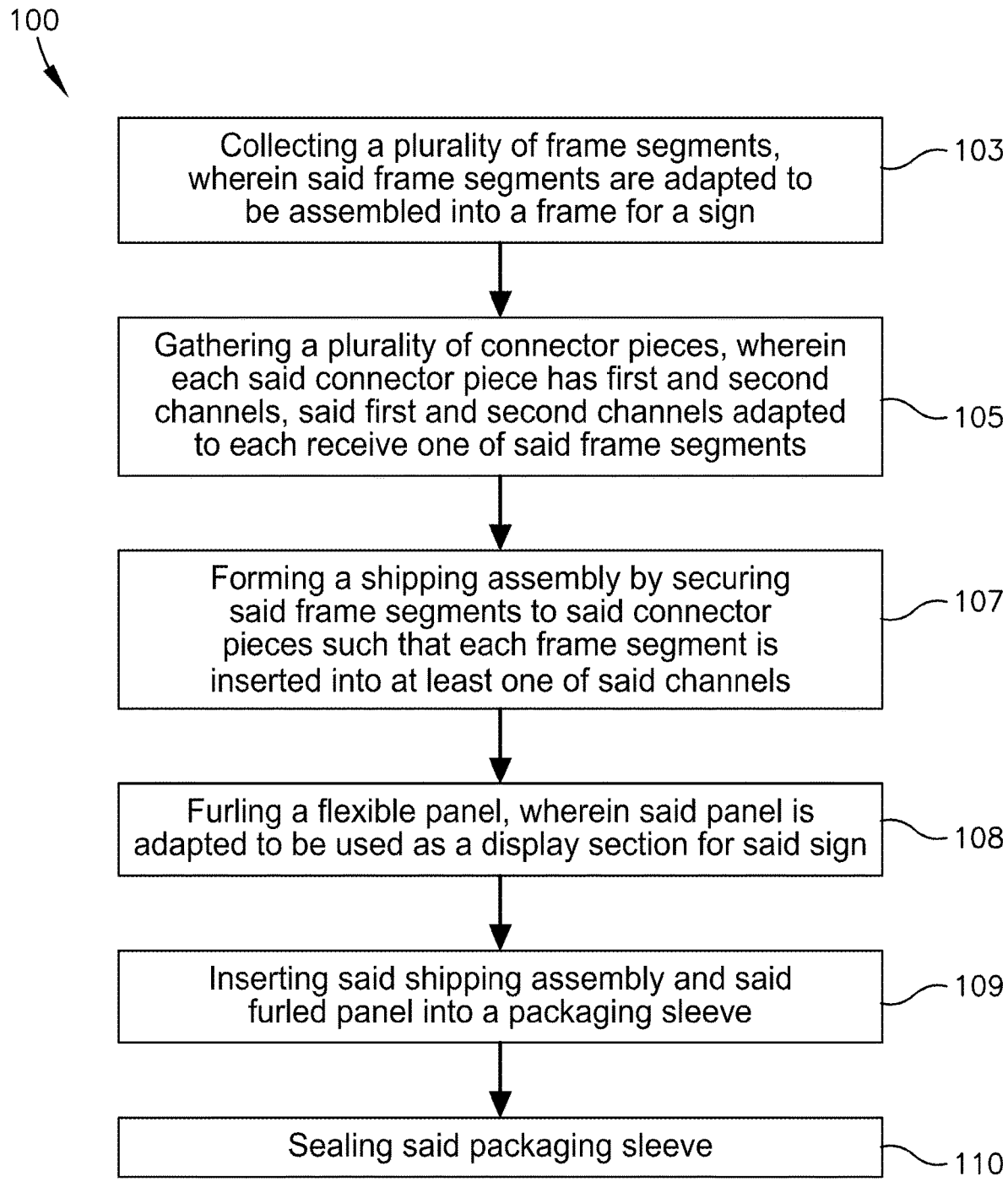
FIG. 31 is a chart illustrating a method of packaging a signage kit.

As shown in FIG. 31, the invention may include a method 100 of packaging a signage kit including the following actions. A plurality of frame segments (e.g., rods) may be collected 103, wherein the segments are adapted to be assembled into a frame for a sign. A plurality of connector pieces may be gathered 105, wherein each said connector piece has first and second channels, said first and second channels adapted to each receive one of said frame segments. At least two of the connector pieces may be corner pieces and each of the corner pieces may have openings formed in the first and second channels. The first channel in a corner piece may be generally perpendicular to the second channel in the corner piece. A shipping assembly may be formed 107 by securing the frame segments to the connector pieces such that each frame segment is inserted into at least one of the channels. A flexible panel may be furled 108, wherein the panel is adapted to be used as a display section for the sign. The shipping assembly and furled panel may be inserted 109 into a packaging sleeve and the sleeve may be sealed 110. The packaging sleeve may be labeled with instructions for assembling the signage kit.

It is to be understood that while certain forms of the present invention have been illustrated and described herein, it is not to be limited to the specific forms or arrangement of parts described and shown.

Having thus described the invention, what is claimed as new and desired to be secured by Letters Patent is:

1. A sign comprising:
   a frame assembly having at least two corner pieces, a first linear member, a second linear member, and a third linear member, wherein said corner pieces each include a first channel adapted to receive one of said first and second linear members and a second channel adapted to receive one of said first, second and third linear members, wherein said first channel in each said corner piece is generally perpendicular to said second channel in the same said corner piece and wherein one or more openings are formed in a sidewall of each of said first and second channels; and a display section having a first face and a second face with a receptacle formed between said faces, said receptacle adapted to receive at least a portion of said frame assembly.

2. The sign of claim 1, wherein said first linear member comprises two rods connected by a first coupler.

3. The sign of claim 1, wherein said second linear member comprises two rods connected by a second coupler.

4. The sign of claim 1, wherein said third linear member comprises two rods connected by a third coupler.

5. The sign of claim 2, wherein said first and second linear members are adapted for insertion into the ground.

6. A signage kit comprising:

a plurality of frame segments, wherein said frame segments are adapted to be assembled into a frame for a sign;

a plurality of connector pieces, at least two of which are corner pieces, wherein each said connector piece has a first channel adapted to receive one of said frame segments and a second channel adapted to receive one of said frame segments, wherein one or more openings are formed in a sidewall of each of said first and second channels in each of said corner pieces;

a display having a first face and a second face with a receptacle formed between said faces, said receptacle adapted to receive at least a portion of said frame.

7. The signage kit of claim 6, wherein each of said frame segments comprises a rod.

8. The signage kit of claim 7, further comprising a packaging sleeve.

9. The signage kit of claim 8, wherein said plurality of frame segments, said plurality of connector pieces, and said display are shipped in said packaging sleeve.

* * * * *